March 31, 1936.  A. H. GREENUP  2,036,135
SAFETY COUPLING HOOK
Filed April 6, 1935
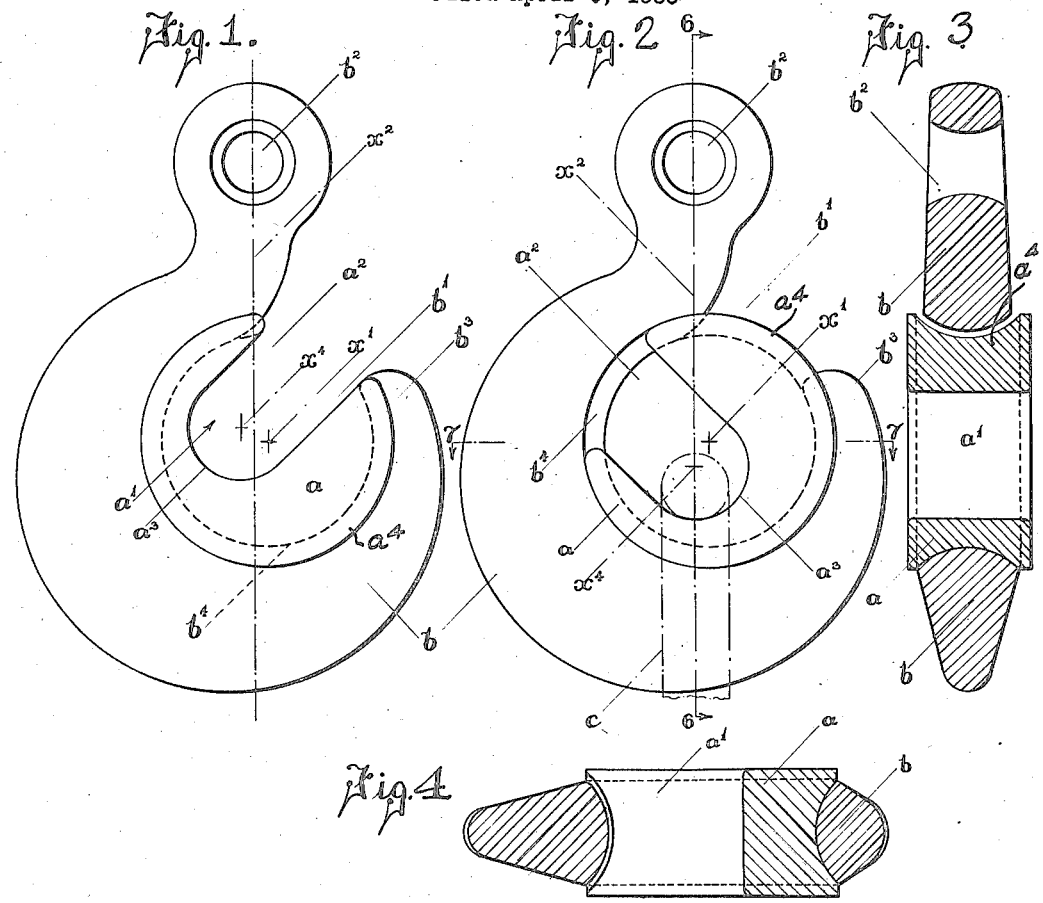

Patented Mar. 31, 1936 2,036,135

UNITED STATES PATENT OFFICE 2,036,135

SAFETY COUPLING-HOOK

Alan Herbert Greenup, Weston-super-Mare, England

Application April 6, 1935, Serial No. 15,114
In Great Britain April 3, 1934

3 Claims. (Cl. 294—82)

This invention has reference to new and useful improvements in safety coupling hooks for connecting loads to lifting and tractive tackle and to vehicle safety-couplings of the hook-and-shackle type.

It is one of the objects of the present invention to provide a safety coupling hook wherein a disc-like locking member journalled within a hook of substantially conventional construction, always assumes a position wherein the jaw of a recess in the said disc registers with the gate of the said hook when the coupling is unloaded, so that the coupling is always ready to receive a load-carrying or traction member.

Another object of the invention is to provide for the gate of the hook being closed automatically by the locking disc as soon as the coupling is put under load.

It is a further object of the invention to so arrange the recess in the locking disc that the angular displacement of the latter by the load is never such that the load is applied direct to the hook.

With the above and other objects in view, reference is had to the accompanying drawing, wherein:—

Figure 1 is an elevation of a safety coupling hook for connecting loads to lifting tackle, in its normal unloaded condition.

Fig. 2 is a similar view to Fig. 1 but shows the coupling loaded.

Fig. 3 is a longitudinal section of the coupling along the line 6—6, Fig. 2.

Fig. 4 is a cross-section along the line 7—7, Fig. 2.

In a preferred form of my invention the hook is of substantially ordinary or conventional construction and incorporates a disc-like locking member $a$ which is journalled or rotationally housed within the body of the said hook and is adapted to receive the end of a chain-link or the pin of a shackle or similar expedient as indicated by $c$ in Figure 2. The shank of the hook has the usual suspension-eye $b^2$ to take (for example) the shackle-pin of a lifting or traction tackle, whilst the inside of the said hook is conformed to a circle struck from a centre $x^1$ located between the major centre-line $x^2$ of the hook and its point or nose $b^3$. The hook thus embodies a circular internal journal-bearing $b^4$ for the member $a$, and the periphery of the said member $a$ is grooved or channelled and engaged over the said bearing $b^4$ so that it may turn or rotate freely in the hook although incapable of appreciable displacement with respect thereto.

The locking member $a$ is formed with a gap or jaw $a^1$ which opens to one edge of the said member and whose mouth $a^2$ is of such a width that, when the locking member is so positioned in the hook that the said mouth $a^2$ registers with the entrance $b^1$ to the inside of the said hook, a chain-link, tackle-shackle or the like ($c$) may be passed into the jaw and seated in the inner end $a^3$ thereof. Then, by the relative rotational movement of the locking member with respect to the hook, a solid or ungapped part $a^4$ of the former may be taken across the entrance to the latter as shown in Figure 2 and thus "lock" the said shackle or the like in connection with the said hook.

To ensure that after the shackle $c$ has been passed into the jaw of the locking member, the latter will automatically close the entrance to the hook immediately as the parts come under load, and to keep the locking member in its closure position so long as the said hook is loaded, the jaw of the member $a$ is so disposed or arranged with respect to the journal-bearing centre $x^1$ that when the said disc is in the "open" position as shown in Figure 4, the inner or load-seating end $a^3$ of the said jaw is positioned in eccentric relation to the journal-bearing surface $b^4$ with the centre $x^4$ of its seating $a^3$ lying on the side of the major centre-line $x^2$ remote from the entrance $b^1$ to the hook.

When the member $a$ is thus positioned, the centre $x^4$ of the jaw-seating and the centre $x^1$ of the bearing surface are substantially equidistant from the said centre-line $x^2$, and it therefore results that, after a loaded shackle pin has been passed into the open jaw $a^1$ and immediately the hoisting or hauling of the load is commenced, the initial resistance of the said load, acting on the part of the member $a$ which is eccentric to the journal bearing, compels the said member to turn within the hook to a position (Figure 2) where its jaw centre $x^4$ lies in the centre-line $x^2$ and the solid part $a^4$ closes or obstructs the hook-entrance $b^1$ and thus "locks" the load in the sense that it is impossible for the hook and load to become separated, even in cases where a load encounters obstructions during lifting, or where a load has to be lifted or transported obliquely to a perpendicular. It may be arranged that the locking member is automatically turned into the locking position before the full load comes on the coupling, and that so long as the said member is maintained in this position, it serves to locate the load in alignment with the centre-line $x^2$, and to distribute the said load over the whole of the lower half of the said hook. Further, it may be arranged that by localizing the greater mass in the part $a^4$ of the member $a$, it will automatically return to the "open" position (Figure 4) when the load is relieved and thus facilitate the detachment of the hook from the said load.

If desired, a latch or fastening device may be arranged in connection with the locking member for mechanically securing the same in its locking position, and thus prevent disconnection of the hook from a shackle or the like when not under load action. This fastening is so arranged that it does not interfere with the automatic locking movement when the member $a$ is displaced by load resistance.

Having described my invention, what I claim and desire to secure by Letters Patent is:—

1. A safety coupling comprising a hook and a disc-like locking member journalled within the body of the said hook, the said locking member having a peripheral jaw the inner end of which conforms to an arc of a circle struck from a center which, when the mouth of the said jaw registers with the gate of the said hook, is disposed on the side of the major center line of the coupling remote from the nose of the said hook.

2. A safety coupling comprising a hook and a disc-like locking member journalled within the body of said hook, the said locking member having a peripheral jaw the inner end of which conforms to an arc of a circle struck from a center which, when the mouth of the said jaw registers with the gate of the said hook, is located on the side of the major center line of the coupling, remote from the nose of the said hook, the major center line of the said jaw being so disposed that it never passes through the center of the said locking member.

3. A safety coupling comprising a hook and a disc-like locking member journalled within the body of the said hook, the said body conforming to an arc of a circle struck from a center which is disposed on the same side of the major center line of the coupling as the nose of the said hook, the said locking member having a peripheral jaw the inner end of which conforms to an arc of a circle struck from a center which, when the mouth of the said jaw registers with the gate of the said hook, is disposed on the opposite side of the major center line of the coupling to the center of the said hook body.

ALAN HERBERT GREENUP.